(12) United States Patent
Gu et al.

(10) Patent No.: US 7,889,803 B2
(45) Date of Patent: Feb. 15, 2011

(54) TIME AND FREQUENCY DOMAIN BASED APPROACHES FOR FINE TIMING AND FREQUENCY ESTIMATIONS

(75) Inventors: Yongru Gu, Lake Forest, CA (US); Jun Ma, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 556 days.

(21) Appl. No.: 12/034,717

(22) Filed: Feb. 21, 2008

(65) Prior Publication Data

US 2009/0213943 A1 Aug. 27, 2009

(51) Int. Cl.
*H04L 27/28* (2006.01)
(52) U.S. Cl. .................. 375/260; 375/316
(58) Field of Classification Search ............ 375/260, 375/267, 316
See application file for complete search history.

(56) References Cited

U.S. PATENT DOCUMENTS

2005/0125176 A1* 6/2005 Makhlouf et al. ............ 702/69
2006/0159188 A1* 7/2006 Izumi ........................ 375/260

OTHER PUBLICATIONS

Speth, et al., "Optimum Receiver Design for Wireless Broad-Band Systems Using OFDM-Part I," IEEE Transactions on Communications, vol. 47, No. 11, Nov. 1999, pp. 1668-1677.

* cited by examiner

*Primary Examiner*—Chieh M. Fan
*Assistant Examiner*—Freshteh N Aghdam
(74) *Attorney, Agent, or Firm*—Rahman LLC

(57) ABSTRACT

A method and apparatus for estimating timing and frequency offsets in an ISDB-T and ISDB-TSB receiver. In different embodiments, the method comprises estimating timing and frequency offsets by different estimation processes; assigning weights to the timing and frequency offsets according to the channel condition; and calculating timing and frequency offsets using the estimates of timing and frequency offsets and the weights.

20 Claims, 9 Drawing Sheets

TIME AND FREQUENCY DOMAIN BASED APPROACHES FOR FINE TIMING AND FREQUENCY ESTIMATIONS

BACKGROUND

1. Technical Field

The embodiments herein generally relate to communication systems, and more particularly to the field of orthogonal frequency division multiplexing (OFDM) communication systems.

2. Description of the Related Art

In conventional OFDM systems, timing and frequency offsets can cause large bit error rate and performance degradation. Timing offset refers to a delay in the received signal relative to the expected signal from the transmitter. Frequency offset refers to the difference between the frequency of a source and a reference frequency.

In a pilot based OFDM system, a traditional method for fine timing and frequency offset estimation is to detect the sub-carrier phase rotation on pilot bins across symbols. The mean phase rotation would indicate the fine frequency offset while the slope of phase rotation across the pilots would indicate the fine timing offset. In ISDB-T and ISDB-TSB, the pilots (referred to as scatter pilots) are placed four OFDM symbols apart in the time domain. For a non-static or a noisy channel, the channel may change substantially after four symbols. As the scatter pilots include a portion of channel changes, the phase rotation of the scatter pilots is generally not a good indicator of the frequency and timing offsets.

Figure 1:
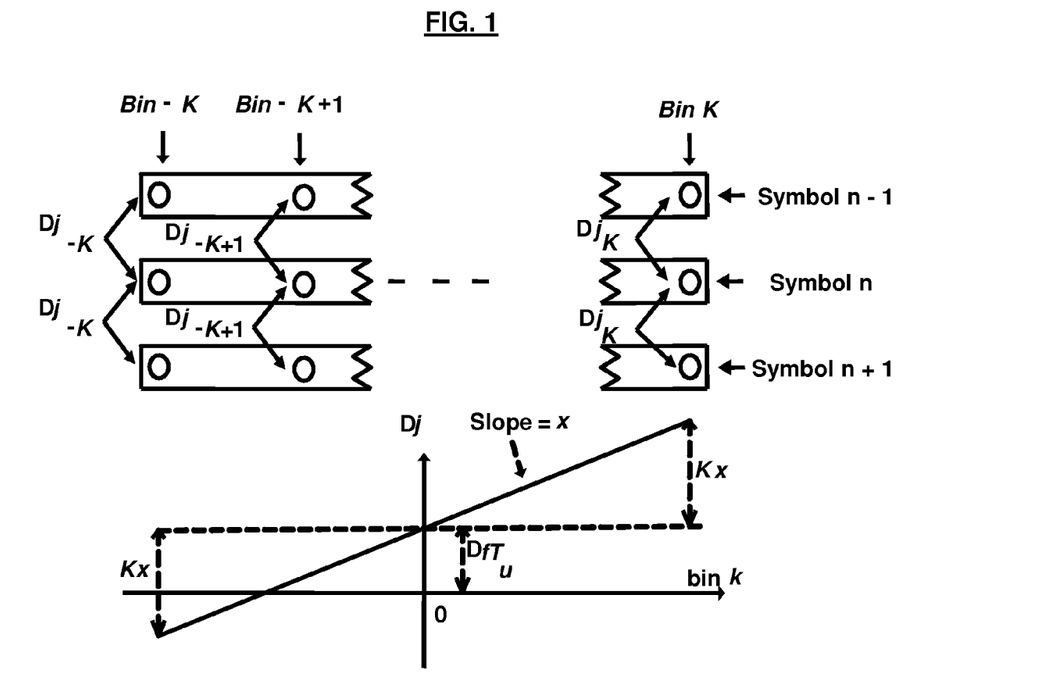
FIG. 1 is a schematic diagram illustrating a sub-carrier phase (bin) rotation due to frequency and timing offset.

In an OFDM system, the phase rotation caused by the timing and frequency offset can be approximated as:

$$\Delta\phi_k \approx \Delta f T_u + \xi k \quad (1)$$

as described in M. Speth et. al, "Optimum receiver design for wireless broad-band systems using OFDM—Part I", *IEEE Trans. on Communications*, vol. 47, no. 11, pp. 1668-1677, November 1999, the complete disclosure of which, in its entirety, is herein incorporated by reference, where $T_u$ is the OFDM symbol time, $\Delta f$ is the frequency offset, $\xi = \Delta T/T$ is the timing offset in percentage, and k is the sub-carrier (bin) index. As illustrated in FIG. 1, the mean of the phase rotation is equal to $\Delta f T_u$ and the slope of the phase rotation curve is the timing offset $\xi$.

The phase rotation in equation (1) can be obtained by taking the phase difference between two received data on the same bin between two adjacent symbols if the transmitted data on that bin is the same for the two symbols. In ISDB-T and ISDB-TSB, there are scatter pilots. The transmitted data on scatter pilots is always the same. In ISDB-T and ISDB-TSB, the phase difference can be taken between two received scatter pilots spaced four symbols away, and its relationship to the timing and frequency offset can be approximated as:

$$\Delta\phi_k \approx 4(\Delta f T_u + \xi k) \quad (2)$$

In the approximation shown in equation (2), a basic assumption is that the channel should stay almost unchanged for four symbols. In a high Doppler channel, the channel can change substantially, and the relationship in equation (2) may not hold true. As seen, with the increase in the rate of changes in the channel, the estimations of the timing and frequency offsets deteriorate considerably resulting in large bit error rates and poor system performance.

SUMMARY

In view of the foregoing, the embodiments herein provide a method of timing and frequency offset estimation for a channel in an OFDM system, and a program storage device readable by computer, tangibly embodying a program of instructions executable by the computer to perform the method of timing and frequency offset estimation for a channel in an OFDM system, wherein the method comprises estimating timing and frequency offsets by more than one estimation process; assigning weights to the timing and frequency offsets, based on the condition of the channel; and calculating timing and frequency offsets using the estimates of timing and frequency offsets and the weights.

Preferably, the estimation process comprises a scatter pilot based timing and frequency offset estimating process, and wherein the method may further comprise calculating a phase difference between two received scatter pilots spaced four OFDM symbols apart; and approximating the timing and frequency offset using $\Delta\phi_k \approx 4(\Delta f T_u + \xi k)$, where $T_u$ is a OFDM symbol time, $\Delta f$ is a frequency offset, $\xi = \Delta T/T$ is a timing offset in percentage, and k is a sub-carrier (bin) index. Moreover, the estimation process may comprise a Transmission Multiplexing Configuration Control (TMCC) based timing and frequency offset estimating process, and wherein the method may further comprise approximating a phase difference of a TMCC bin over two adjacent symbols as $\Delta\phi_k \approx \Delta f T_u + \xi k + Ph_{tmcc}$, where $T_u$ is a OFDM symbol time, $\Delta f$ is a frequency offset, $\xi = \Delta T/T$ is a timing offset in percentage, k is a sub-carrier (bin) index, and $Ph_{tmcc}$ reflects TMCC data modulated on TMCC bins; locking TMCC information for each the symbol; subtracting modulated TMCC data, $Ph_{tmcc}$, from the approximated phase difference; relating a mean of the phase difference with frequency offset; and using a slope of the phase difference to indicate the timing offset.

Additionally, the estimation process may comprise an auxiliary channel (AC) based timing and frequency offset estimating process, and wherein the method may further comprise approximating a phase difference of an AC bin over two adjacent symbols as $\Delta\phi_k \approx \Delta f T_u + \xi k + Ph_{ac}$, where $T_u$ is a OFDM symbol time, $\Delta f$ is a frequency offset, $\xi = \Delta T/T$ is a timing offset in percentage, k is a sub-carrier (bin) index, and $Ph_{ac}$ is AC data modulated on AC bins; estimating a value of the $Ph_{ac}$; subtracting the estimated value of $Ph_{ac}$ from the phase difference; relating a mean of the phase difference with frequency offset; and using a slope of the phase difference to indicate the timing offset.

Furthermore, the estimation process may comprise a channel estimated based timing and frequency offset estimating process, and wherein the method may further comprise interpolating channel estimates on each sub-carrier using scatter pilots; calculating a phase difference on the channel estimate on each sub-carrier over two adjacent symbols; relating a mean of the phase difference with frequency offset; and using a slope of the phase difference to indicate the timing offset. Also, the estimation process may comprise a time-domain correlation based frequency offset estimating process, and wherein the method may further comprise correlating a currently received symbol with a conjugate of a previous symbol received one symbol time ($T_u$) prior to the currently received symbol; passing the correlated symbol through a moving average filter, wherein the filter comprises a window length equal to the time for a guard interval ($T_g$); integrating an output of the moving average filter over N symbols with a window size of $(T_u+T_g)$; and detecting a peak of the integrator outputs with a phase of the peak indicating frequency offset. Preferably, the weight is fixed. Additionally, the weights may be assigned based on channel conditions.

Another embodiment provides a system for performing timing and frequency offset estimation for a channel in an OFDM system, wherein the system comprises an estimator adapted to estimate timing and frequency offsets by different estimation processes; and a processor adapted to assign weights to the timing and frequency offsets based on condition of the channel; and calculate timing and frequency offsets using the estimates of timing and frequency offsets and the weights. Preferably, the estimator comprises a scatter pilot based timing and frequency offset estimator, and wherein the processor may be further adapted to calculate the phase difference between two received scatter pilots spaced four OFDM symbols apart; and approximate the timing and frequency offset using $\Delta\phi_k \approx 4(\Delta f T_u + \xi k)$, where $T_u$ is a OFDM symbol time, $\Delta f$ is a frequency offset, $\xi=\Delta T/T$ is a timing offset in percentage, and k is a sub-carrier (bin) index.

Furthermore, the estimator may comprise a TMCC based timing and frequency offset estimator, and wherein the processor may be further adapted to approximate a phase difference of a TMCC bin over two adjacent symbols as $\Delta\phi_k \approx \Delta f T_u + \xi k + Ph_{tmcc}$, where $T_u$ is a OFDM symbol time, $\Delta f$ is a frequency offset, $\xi=\Delta T/T$ is a timing offset in percentage, k is a sub-carrier (bin) index, and $Ph_{tmcc}$ reflects TMCC data modulated on TMCC bins; lock TMCC information for each the symbol; subtract modulated TMCC data, $Ph_{tmcc}$, from the approximated phase difference; relate a mean of the phase difference with frequency offset; and use a slope of the phase difference to indicate the timing offset. Moreover, the estimator may comprise an AC based timing and frequency offset estimator, and wherein the processor may be further adapted to approximate a phase difference of an AC bin over two adjacent symbols as $\Delta\phi_k \approx \Delta f T_u + \xi k + Ph_{ac}$, where $T_u$ is a OFDM symbol time, $\Delta f$ is a frequency offset, $\xi=\Delta T/T$ is a timing offset in percentage, k is a sub-carrier (bin) index, and $Ph_{ac}$ is AC data modulated on AC bins; estimate a value of the $Ph_{ac}$; subtract the estimated value of $Ph_{ac}$ from the phase difference; relate mean of the phase difference with frequency offset; and use a slope of the phase difference to indicate the timing offset.

Furthermore, the estimator may comprise a channel estimated based frequency offset estimator, and wherein the processor may be further adapted to interpolate channel estimates on each sub-carrier using scatter pilots; calculate a phase difference on the channel estimate on each sub-carrier over two adjacent symbols; relate a mean of the phase difference with frequency offset; and use a slope of the phase difference to indicate the timing offset. Also, the estimator may comprise a time-domain correlation based frequency offset estimator, and wherein the processor may be further adapted to correlate a currently received symbol with a conjugate of a previous symbol received one symbol time $(T_u)$ prior to the currently received symbol; pass the correlated symbol through a moving average filter, wherein the filter comprises a window length equal to the time for a guard interval $(T_g)$; integrate an output of the moving average filter over N symbols with a window size of $(T_u+T_g)$; and detect a peak of the integrator outputs with a phase of the peak indicating frequency offset.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide systems and methods to dynamically select the best approach for estimating the frequency and timing offsets according to the channel conditions thereby reducing the bit error rates and thereby improving the system performance in OFDM systems. Referring now to the drawings, and more particularly to FIGS. 2 through 12, where similar reference characters denote corresponding features consistently throughout the figures, there are shown preferred embodiments.

Figure 2:
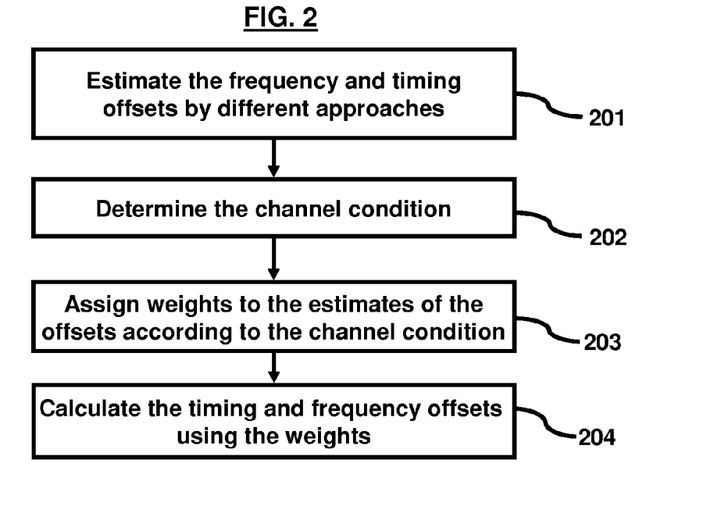
FIG. 2 is a flow diagram illustrating the process of timing and frequency offset estimation according to an embodiment herein.

The embodiments herein provide several fine timing and frequency offset estimation methods. FIG. 2 illustrates the process of timing and frequency offset estimation according to an embodiment herein, wherein the best approach suitable to the present channel condition is dynamically selected (201). Each method provides an estimate of timing and/or frequency offsets. The estimated offsets are assigned (203) weights, where the weights are determined (202) according to a channel condition. A fixed weight can also be used regardless of channel conditions. Channel conditions are usually quantified by the channel impulse response length, also known as the channel delay spread and channel maximum Doppler frequency. Thereafter, timing and frequency offsets are calculated (204) by a weighted combination of the estimates.

Figure 3:
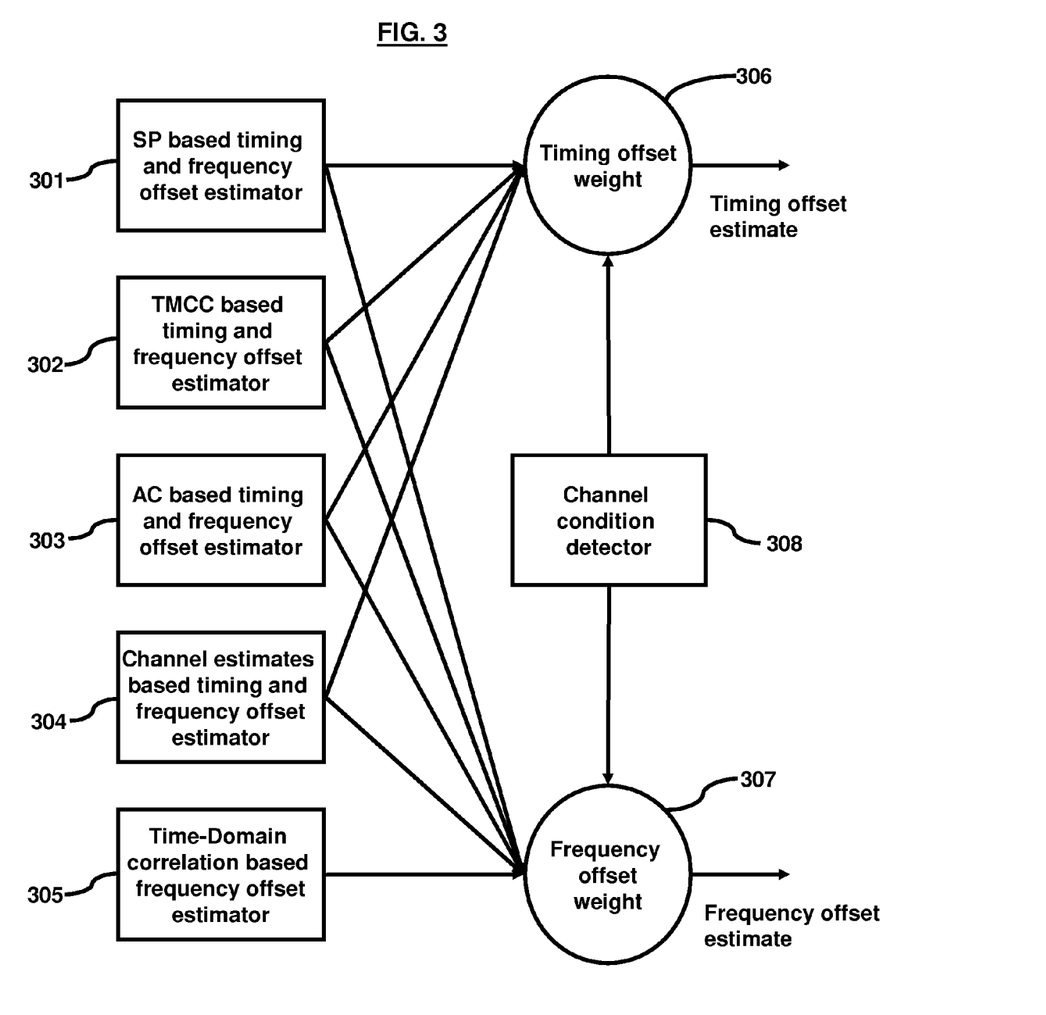
FIG. 3 is a block diagram of timing and frequency offset estimation according to an embodiment herein.

FIG. 3 is a block diagram of timing and frequency offset estimation according to an embodiment herein. The timing offset may be estimated by various means including a scatter pilot based timing offset estimator 301, a timing offset estimator based on TMCC 302, a timing offset estimator based on an AC 303, and a timing offset estimator based on channel estimates 304. A channel condition detector 308 detects the condition of the channel and estimates weights based on the condition of the channel 306. The final timing offset is a combination of the weights and estimations as obtained by the means.

To calculate the frequency offset, a frequency offset is estimated by various means. The various means comprises a scatter pilot based frequency offset estimator 301, a frequency offset estimator based on TMCC 302, a frequency offset estimator based on the AC 303, a frequency offset estimator based on channel estimates 304, and a frequency offset estimator based on time-domain correlation 305. A channel condition detector 308 detects the condition of the channel and estimates weights based on a condition of the channel. The final frequency offset is a combination of the weights and estimations as obtained by the means (301-305).

Figure 4:
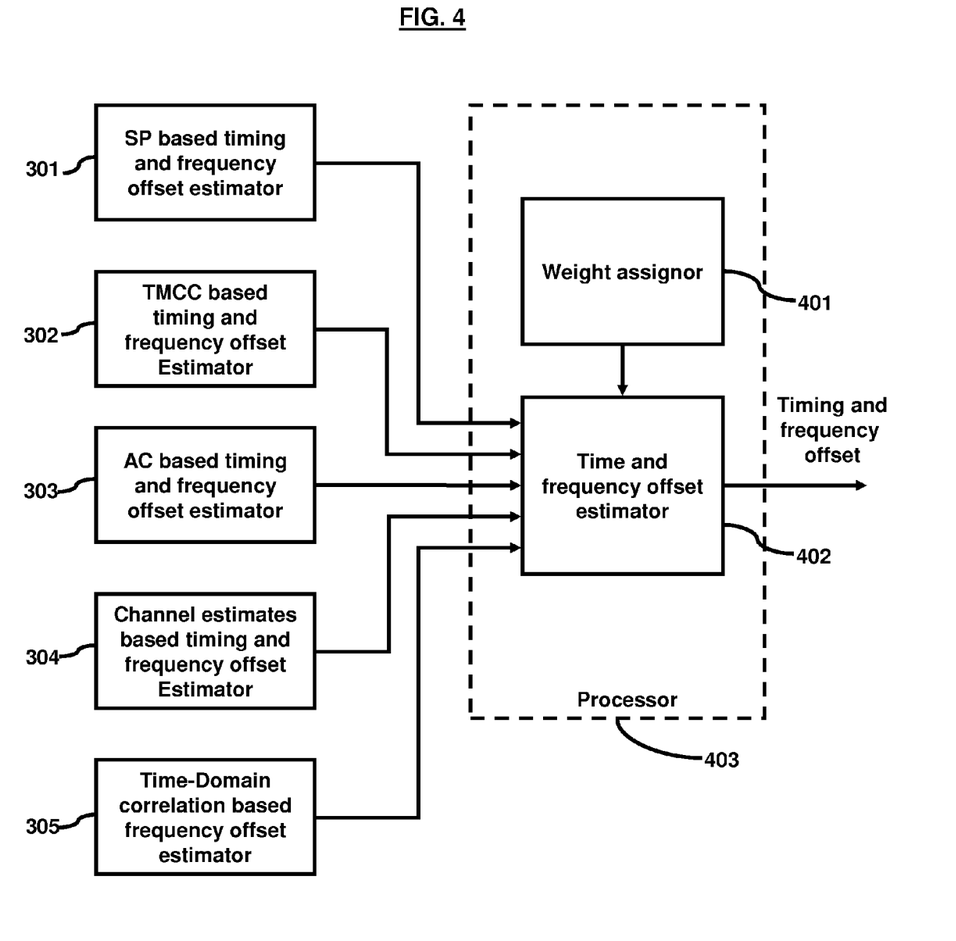
FIG. 4 is a system diagram for timing and frequency offset estimation according to an embodiment herein.

FIG. 4, with reference to FIG. 3, is a system diagram for timing and frequency offset estimation according to an embodiment herein. Various means as mentioned above (301-305) are used to estimate offsets. The estimates are provided to a processor 403, wherein the processor 403 comprises a time and frequency offset estimator 402 and an assignor unit 401 to assign weights. The estimator 402 calculates the offsets using the estimated value of offsets and weights assigned according to channel conditions.

Figure 5:
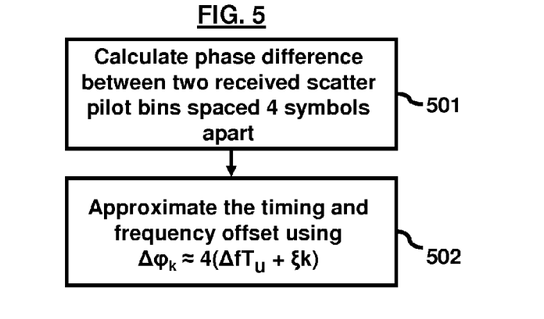
FIG. 5 is a flow diagram illustrating a method of frequency and timing offset according to an embodiment herein.

FIG. 5, with reference to FIG. 3, is a flow diagram illustrating a method of frequency and timing offset according to an embodiment herein. The estimator based on scatter pilots 301 detects (501) a sub-carrier phase difference on scatter pilot bins across symbols, where the scatter pilots are placed four OFDM symbols away in the time domain. The relationship between the phase difference and timing and frequency offsets can be approximated as:

$$\Delta\phi_k \approx 4(\Delta f T_u + \xi k) \quad (2)$$

where $T_u$ is the OFDM symbol time, $\Delta f$ is the frequency offset, $\xi = \Delta T/T$ is the timing offset in percentage, and k is the sub-carrier (bin) index. Timing and frequency offsets are approximated (502) using equation (2). The mean of the phase rotation, denoted by $\Delta f T_u$ indicates frequency offset, while the slope of the phase rotation across the scatter pilots, denoted by $\xi = \Delta T/T$ indicates the timing offset.

Figure 6:
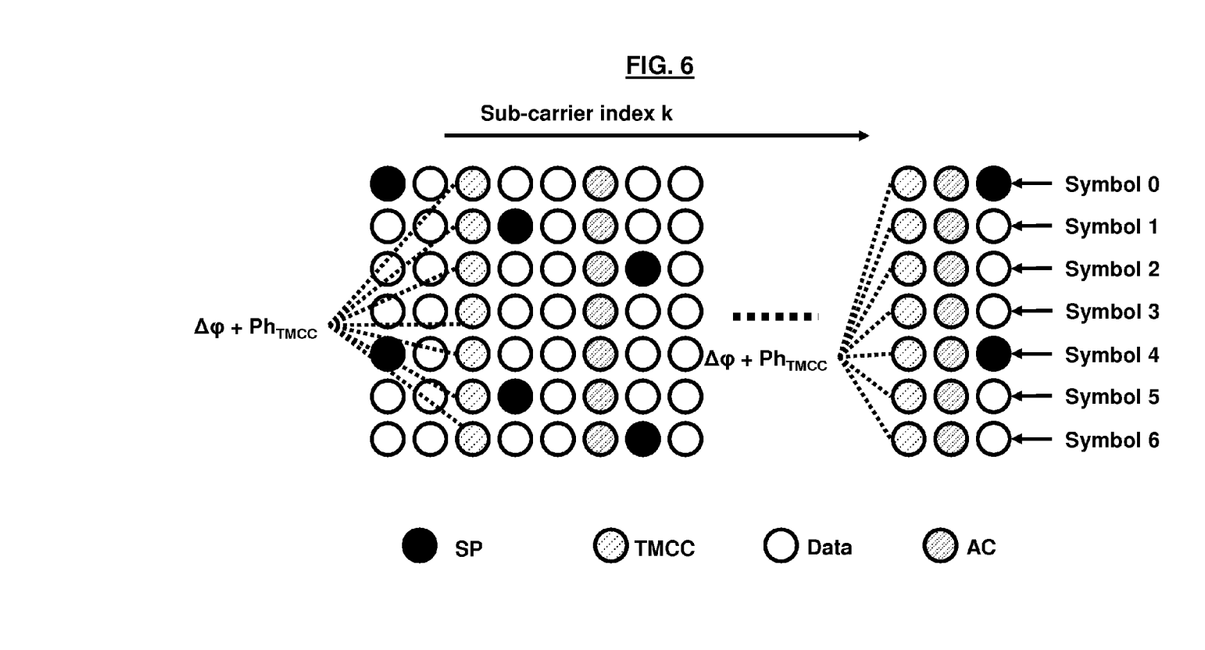
FIG. 6 illustrates the phase difference of TMCC bin over two symbols according to an embodiment herein.
Figure 7:
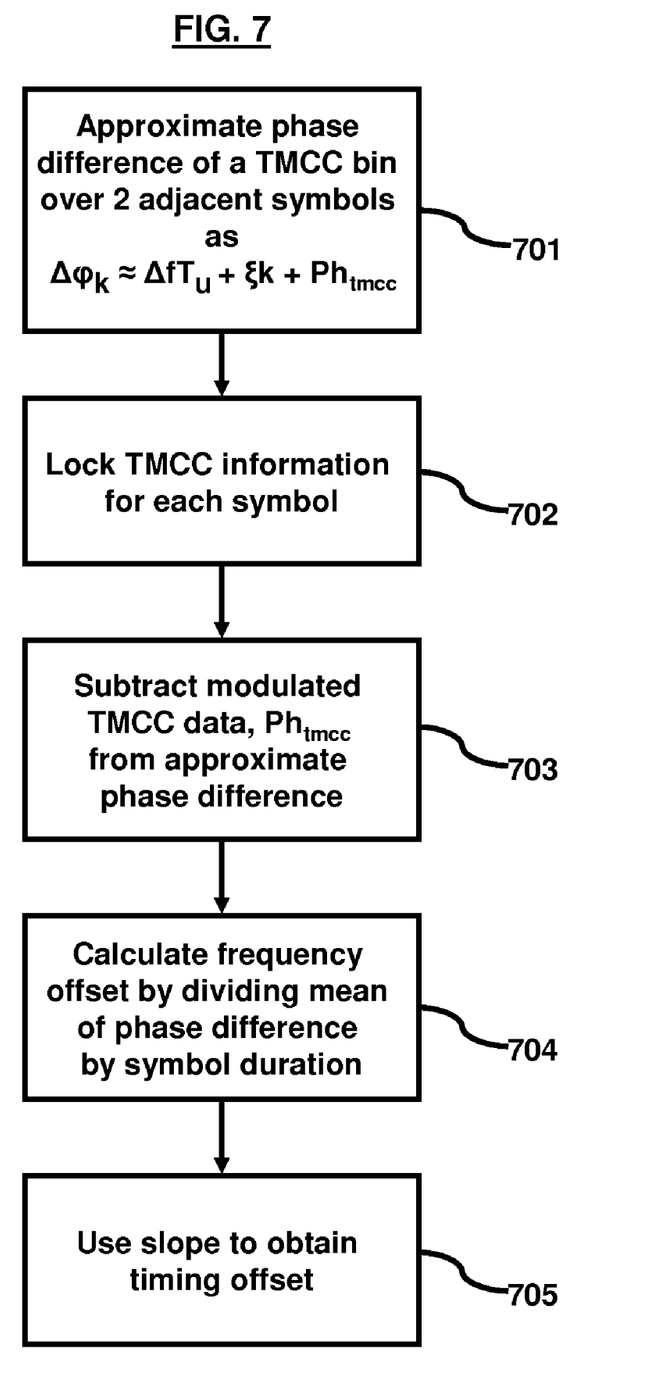
FIG. 7 is a flow diagram illustrating a method of frequency and timing offset according to a first embodiment herein.

The estimator based on TMCC 302 uses phase rotation on TMCC sub-carriers to estimate frequency and timing offsets, wherein the TMCC sub-carriers are placed continuously in ISDB-T and ISDB-TSB channels. FIG. 6 shows how the phase difference of the TMCC bins is taken. FIG. 7, with reference to FIG. 3, is a flow diagram illustrating a method of frequency and timing offset according to a first embodiment herein. The phase difference of a TMCC bin over two adjacent symbols is approximated (701) as:

$$\Delta\phi_k \approx \Delta f T_u + \xi k + Ph_{tmcc} \quad (3)$$

where $Ph_{tmcc}$ reflects TMCC data modulated on TMCC bins. After TMCC information is locked (702) for each symbol, the modulated TMCC data, $Ph_{tmcc}$ is subtracted (703) from equation (3). TMCC information is preferably locked first to learn the information bit on the TMCC bins, so after subtracting modulated TMCC data, $Ph_{tmcc}$, the phase difference between two symbols reflects the channel phases. After removing the modulated TMCC data, $Ph_{tmcc}$ from equation (3), the frequency offset is calculated (704) by dividing the mean of the phase difference by the symbol duration $T_u$. Then, the slope of phase difference is used to determine (705) the timing offset.

Figure 8:
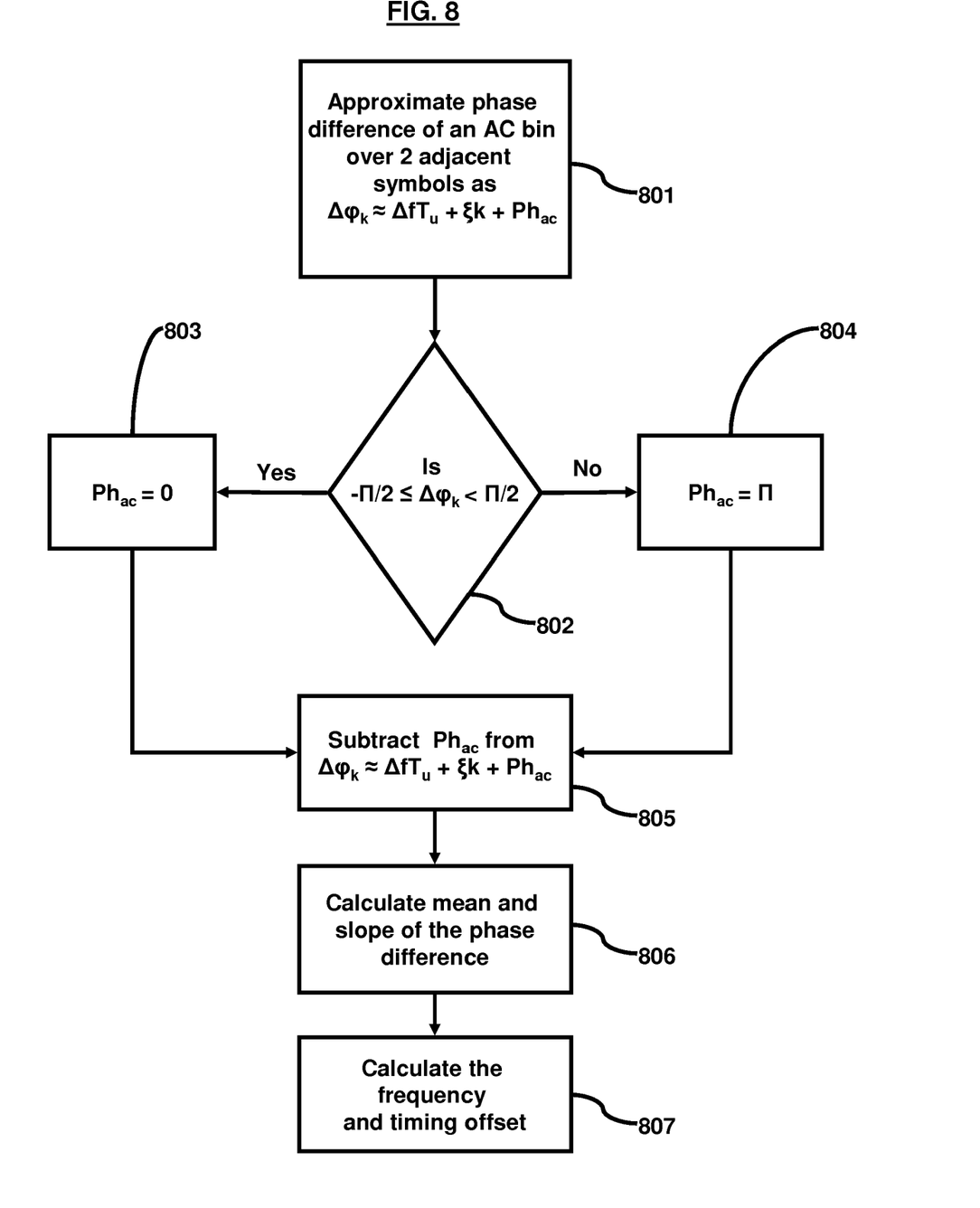
FIG. 8 is a flow diagram illustrating a method of frequency and timing offset according to a second embodiment herein.

The offset estimator based on the AC 303 uses a phase rotation on AC sub-carriers to estimate frequency and timing offsets, wherein the AC sub-carriers are placed continuously in ISDB-T and ISDB-TSB channels. FIG. 8, with reference to FIG. 3, is a flow diagram illustrating a method of frequency and timing offset according to a second embodiment herein. The phase difference of an AC bin over two adjacent symbols is approximated (801) as:

$$\Delta\phi_k \approx \Delta f T_u + \xi k + Ph_{ac} \quad (4)$$

where $Ph_{ac}$ reflects AC data modulated on AC bins. In ISDB-T and ISDB-TSB, $Ph_{ac}$ is either 0 radian or $\Pi$ radians, which depends on the value of phase difference, $\Delta\phi_k$. If (802) $-\Pi/2 \leq \Delta\phi k < \Pi/2$, $Ph_{ac}$ is estimated (803) as 0 radian (Yes); else (No) $Ph_{ac}$ is estimated (804) as $\Pi$ radians. $Ph_{ac}$ is subtracted (805) from equation (4) so that the phase difference, $\Delta\phi_k$ between two symbols reflects the channel phases. After removing the modulated AC data, $Ph_{ac}$ from equation (4), the mean and slope of the phase difference is calculated (806) and then the frequency and timing offset are calculated (807). The slope of the phase difference is equal to the time offset, and the frequency offset is the mean of the phase difference divided by the symbol duration $T_u$.

Figure 9:
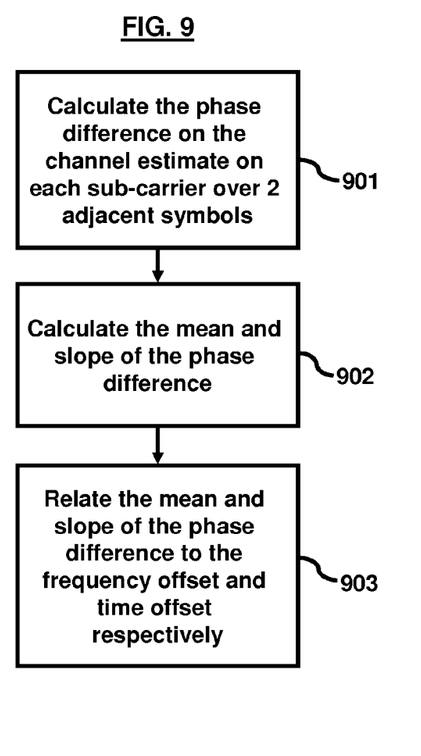
FIG. 9 is a flow diagram illustrating a method of frequency and timing offset according to a third embodiment herein.

FIG. 9, with reference to FIG. 3, is a flow diagram illustrating a method of frequency and timing offset according to a third embodiment herein. The offset estimator based on the channel estimates 304 uses scatter pilots to interpolate channel estimates on each sub-carrier. The phase difference on the channel estimate on each sub-carrier over two adjacent symbols is calculated (901). The mean and slope of the phase difference is calculated (902). The mean of the phase difference indicates (903) the frequency offset and the slope of the phase difference is the timing offset.

Figure 10:
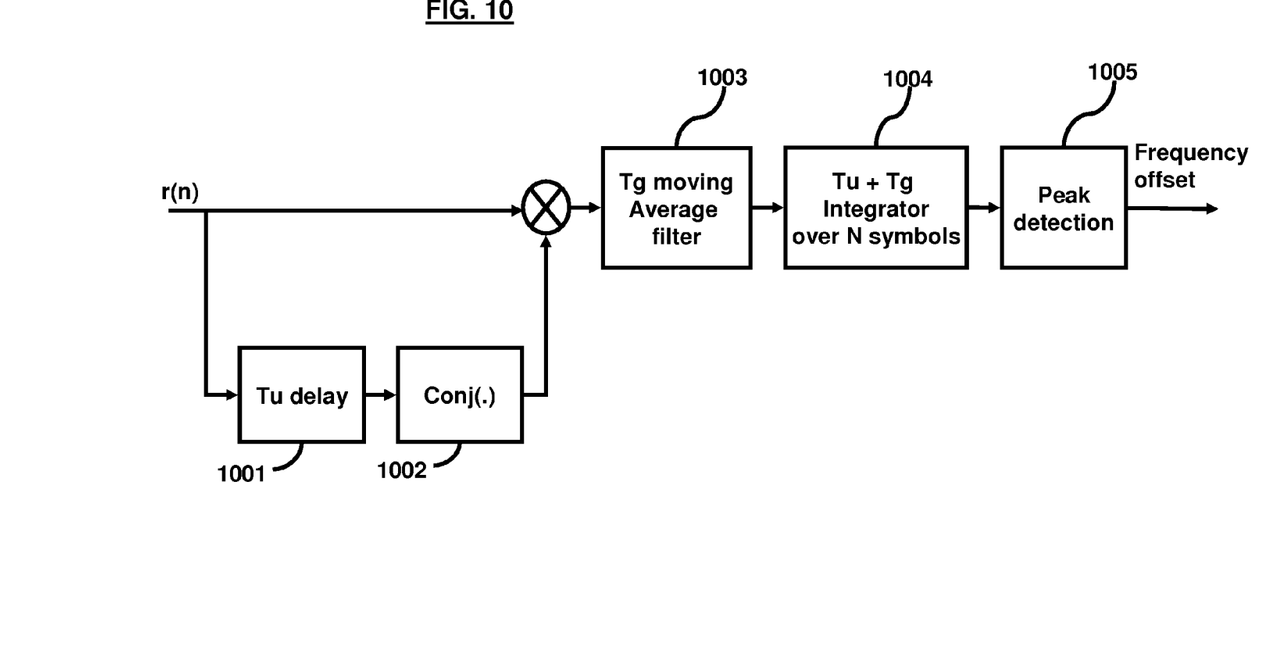
FIG. 10 is a schematic diagram illustrating the time domain correlation for frequency offset detection according to an embodiment herein.
Figure 11:
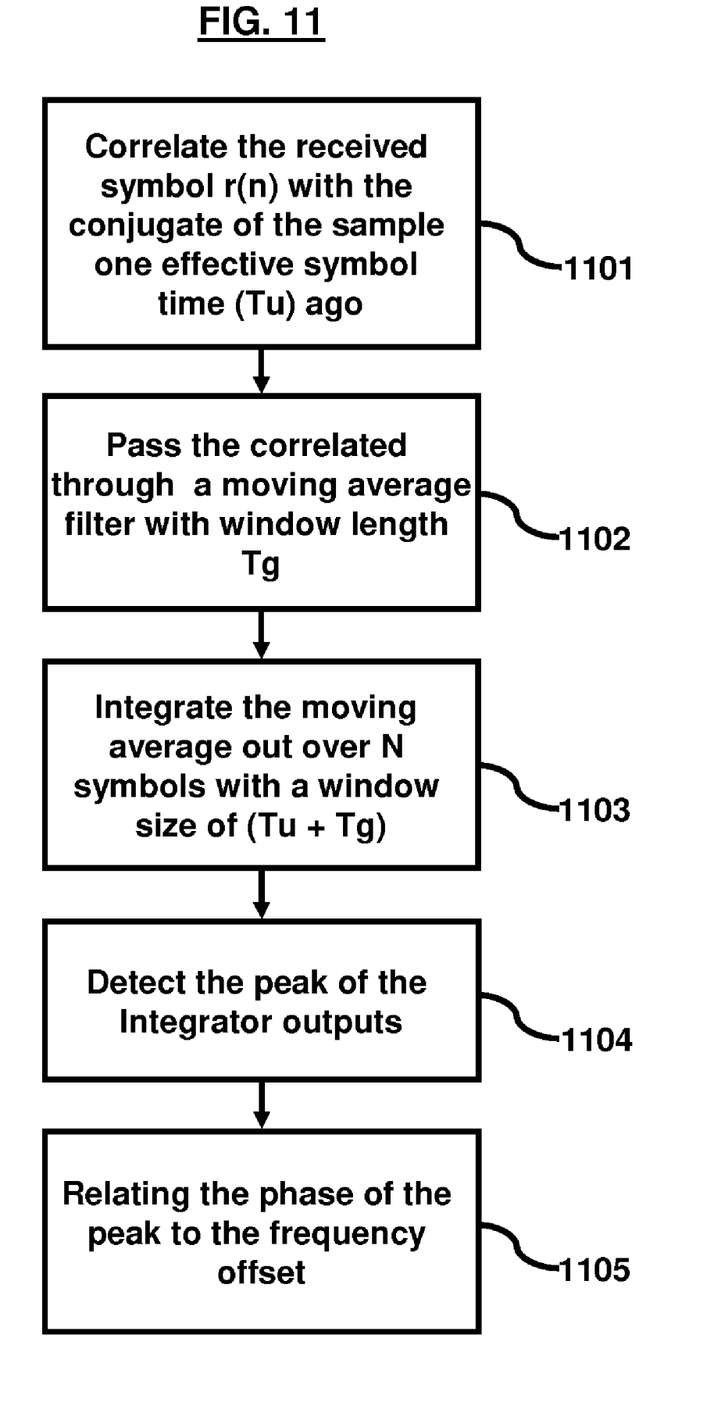
FIG. 11 is a flow diagram illustrating a method of frequency and timing offset according to a fourth embodiment herein.

FIG. 10, with reference to FIG. 3, is a schematic diagram illustrating the time domain correlation for frequency offset detection according to an embodiment herein and FIG. 11, with reference to FIG. 3, is a flow diagram illustrating a method of frequency and timing offset according to a fourth embodiment. The frequency offset estimator based on the time-domain correlation 305 uses the property that an offset in frequency results in a phase slope in samples in time domain. In an ideal channel, the angular information of correlation value indicates the frequency offset. A received sample r(n) is correlated (1101) with a conjugate of the sample of one effective symbol time, $T_u$ ago. The received symbol has been passed through a delay unit 1001 which provides a delay equal to one effective symbol time ($T_u$) before passing the delayed sample through a unit 1002 to take conjugate of the delayed sample. The correlated value is passed (1102) through a moving average filter 1003 with window length $T_g$, where $T_g$ is the time required for a guard interval. The moving average is passed through an integrator 1004, where the integrator 1004 accumulates (1103) the moving average over N symbols with a window size of $T_u+T_g$. The integrator 1004 outputs are passed through a peak detector 1005 to detect (1104) peaks of the outputs, where the phase of the peak indicates (1105) the frequency offset.

The techniques provided by the embodiments herein may be implemented on an integrated circuit chip (not shown) and may be used in digital video broadcast systems for handheld devices, and implemented in the baseband chip sets. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII ) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment, or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
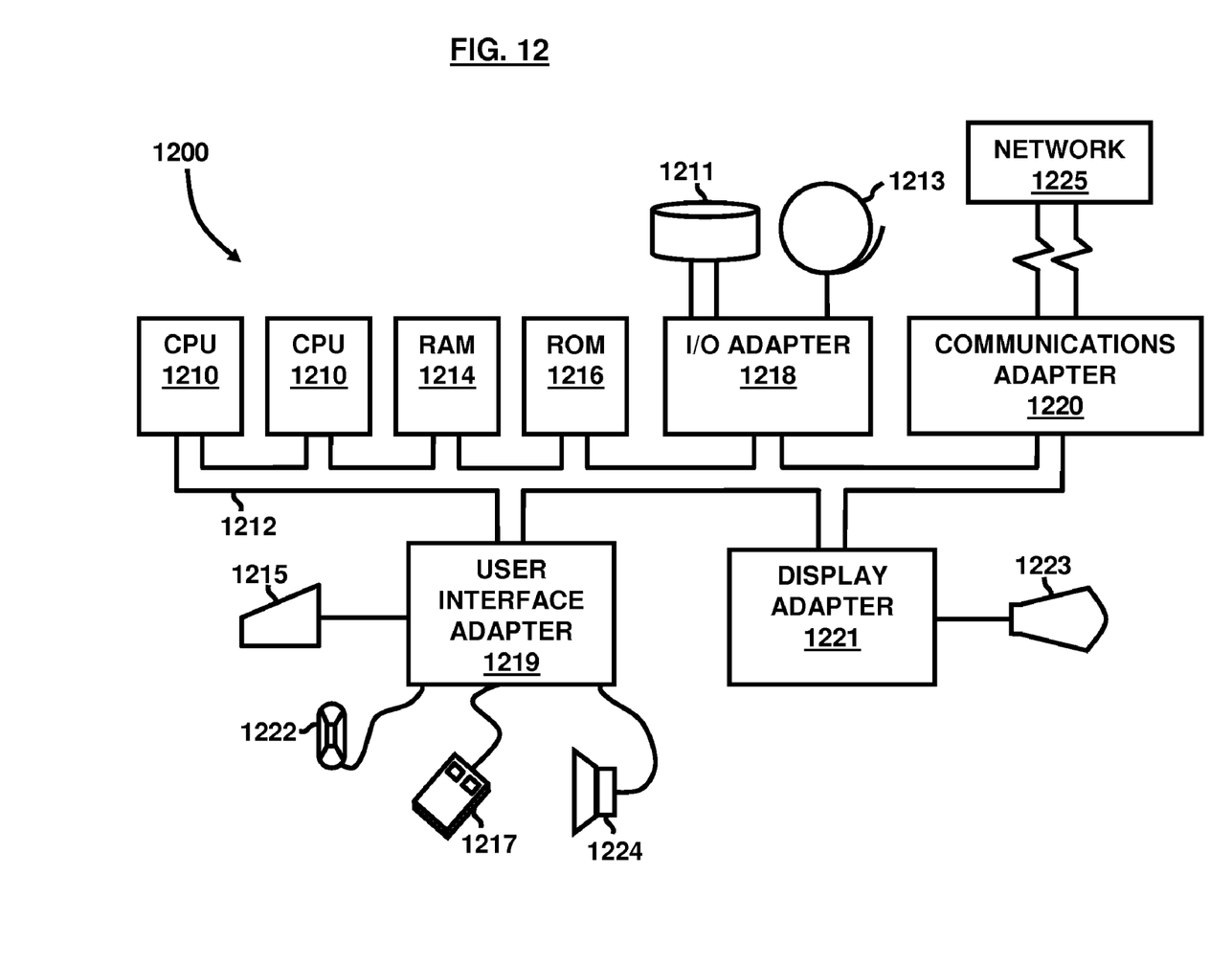
FIG. 12 is a schematic diagram of a computer system used in accordance with the embodiments herein.

A representative hardware environment for practicing the embodiments herein is depicted in FIG. 12. This schematic drawing illustrates a hardware configuration of an information handling/computer system 1200 in accordance with the embodiments herein. The system 1200 comprises at least one processor or central processing unit (CPU) 1210. The CPUs 1210 are interconnected via system bus 1212 to various devices such as a random access memory (RAM) 1214, read-only memory (ROM) 1216, and an input/output (I/O) adapter 1218. The I/O adapter 1218 can connect to peripheral devices, such as disk units 1211 and tape drives 1213, or other program storage devices that are readable by the system 1200. The system 1200 can read the inventive instructions on the program storage devices and follow these instructions to execute the methodology of the embodiments herein. The system 1200 further includes a user interface adapter 1219 that connects a keyboard 1215, mouse 1217, speaker 1224, microphone 1222, and/or other user interface devices such as a touch screen device (not shown) to the bus 1212 to gather user input. Additionally, a communication adapter 1220 connects the bus 1212 to a data processing network 1225, and a display adapter 1221 connects the bus 1212 to a display device 1223 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of timing and frequency offset estimation for a channel in an orthogonal frequency division multiplexing (OFDM) environment, wherein said method comprises:

estimating timing and frequency offsets by more than one estimation process, wherein the estimation process comprises a scatter pilot based timing and frequency offset estimating process;

assigning weights to said timing and frequency offsets based on a condition of said channel;

said scatter pilot based timing and frequency offset estimating process comprises:
  calculating timing and frequency offsets using said estimates of timing and frequency offsets and said weights;
  calculating a phase difference between two received scatter pilots spaced four OFDM symbols apart; and
  approximating the timing and frequency offset using $\Delta\phi_k \approx 4(\Delta f T_u + \xi k)$, where $T_u$ is an OFDM symbol time, $\Delta f$ is a frequency offset, $\xi = \Delta T/T$ is a timing offset in percentage, and k is a sub-carrier (bin) index.

2. The method of claim 1, wherein said weights are assigned based on channel conditions.

3. A method of timing and frequency offset estimation for a channel in an orthogonal frequency division multiplexing (OFDM) environment, wherein said method comprises:
  estimating timing and frequency offsets by more than one estimation process, wherein the estimation process comprises a Transmission Multiplexing Configuration Control (TMCC) based timing and frequency offset estimating process;
  assigning weights to said timing and frequency offsets based on a condition of said channel;
  said TMCC based timing and frequency offset estimation process comprises:
    calculating timing and frequency offsets using said estimates of timing and frequency offsets and said weights;
    approximating a phase difference of a TMCC bin over two adjacent symbols as $\Delta\phi_k \approx \Delta f T_u + \xi k + Ph_{tmcc}$, where $T_u$ is a OFDM symbol time, $\Delta f$ is a frequency offset, $\xi = \Delta T/T$ is a timing offset in percentage, k is a sub-carrier (bin) index, and $Ph_{tmcc}$ reflects TMCC data modulated on TMCC bins;
    locking TMCC information for each said symbol;
    subtracting modulated TMCC data, $Ph_{tmcc}$, from said approximated phase difference;
    relating a mean of said phase difference with frequency offset; and
    using a slope of said phase difference to indicate said timing offset.

4. The method of claim 3, wherein said weights are assigned based on channel conditions.

5. A method of timing and frequency offset estimation for a channel in an orthogonal frequency division multiplexing (OFDM) environment, wherein said method comprises:
  estimating timing and frequency offsets by more than one estimation process, wherein the estimation process comprises an auxiliary channel (AC) based timing and frequency offset estimating process;
  assigning weights to said timing and frequency offsets based on a condition of said channel;
  said AC based timing and frequency offset estimating process comprises:
    calculating timing and frequency offsets using said estimates of timing and frequency offsets and said weights;
    approximating a phase difference of an AC bin over two adjacent symbols as $\Delta\phi_k \approx \Delta f T_u + \xi k + Ph_{ac}$, where $T_u$ is a OFDM symbol time, $\Delta f$ is a frequency offset, $\xi = \Delta T/T$ is a timing offset in percentage, k is a sub-carrier (bin) index, and $Ph_{ac}$ is AC data modulated on AC bins;
    estimating a value of said $Ph_{ac}$;
    subtracting said estimated value of $Ph_{ac}$ from said phase difference;
    relating a mean of said phase difference with frequency offset; and
    using a slope of said phase difference to indicate said timing offset.

6. The method of claim 5, wherein said weights are assigned based on channel conditions.

7. A method of timing and frequency offset estimation for a channel in an orthogonal frequency division multiplexing (OFDM) environment, wherein said method comprises:
  estimating timing and frequency offsets by more than one estimation process, wherein the estimation process comprises a channel estimated based timing and frequency offset estimating process;
  assigning weights to said timing and frequency offsets based on a condition of said channel;
  said channel estimated based timing and frequency offset estimating process comprises:
    calculating timing and frequency offsets using said estimates of timing and frequency offsets and said weights;
    interpolating channel estimates on each sub-carrier using scatter pilots;
    calculating a phase difference on said channel estimate on each sub-carrier over two adjacent symbols;
    relating a mean of said phase difference with frequency offset; and
    using a slope of said phase difference to indicate said timing offset.

8. The method of claim 7, wherein said weights are assigned based on channel conditions.

9. A method of timing and frequency offset estimation for a channel in an orthogonal frequency division multiplexing (OFDM) environment, wherein said method comprises:
  estimating timing and frequency offsets by more than one estimation process, wherein the estimation process comprises a time-domain correlation based frequency offset estimating process;
  assigning weights to said timing and frequency offsets based on a condition of said channel;
  said time-domain correlation based timing and frequency offset estimating process comprises:
    calculating timing and frequency offsets using said estimates of timing and frequency offsets and said weights;
    correlating a currently received symbol with a conjugate of a previous symbol received one symbol time ($T_u$) prior to said currently received symbol;
    passing said correlated symbol through a moving average filter, wherein the filter comprises a window length equal to the time for a guard interval ($T_g$);
    integrating an output of said moving average filter over N symbols with a window size of ($T_u + T_g$); and
    detecting a peak of the integrator outputs with a phase of said peak indicating frequency offset.

10. The method of claim 9, wherein said weights are assigned based on channel conditions.

11. A system for performing timing and frequency offset estimation for a channel in an orthogonal frequency division multiplexing (OFDM) environment, wherein said system comprises:
  an estimator configured to estimate timing and frequency offsets by different estimation processes, wherein said estimator comprises a scatter pilot based timing and frequency offset estimator; and
  a processor configured to:
    assign weights to said timing and frequency offsets based on condition of said channel;
    said scatter pilot based timing and frequency offset estimator configured to:
      calculate timing and frequency offsets using said estimates of timing and frequency offsets and said weights;

calculate phase difference between two received scatter pilots spaced four OFDM symbols apart; and approximate the timing and frequency offset using $\Delta\phi_k \approx 4(\Delta f T_u + \xi k)$, where $T_u$ is an OFDM symbol time, $\Delta f$ is a frequency offset, $\xi = \Delta T/T$ is a timing offset in percentage, and k is a sub-carrier (bin) index.

12. The system of claim 11, wherein said weights are assigned based on channel conditions.

13. A system for performing timing and frequency offset estimation for a channel in an orthogonal frequency division multiplexing (OFDM) environment, wherein said system comprises:

an estimator configured to estimate timing and frequency offsets by different estimation processes, wherein said estimator comprises a Transmission Multiplexing Configuration Control (TMCC) based timing and frequency offset estimator; and a processor configured to:
assign weights to said timing and frequency offsets based on condition of said channel;
said TMCC based timing and frequency offset estimator configured to:
calculate timing and frequency offsets using said estimates of timing and frequency offsets and said weights;
approximating a phase difference of a TMCC bin over two adjacent symbols as $\Delta\phi_k \approx \Delta f T_u + \xi k + Ph_{tmcc}$, where $T_u$ is a OFDM symbol time, $\Delta f$ is a frequency offset, $\xi = \Delta T/T$ is a timing offset in percentage, k is a sub-carrier (bin) index, and $Ph_{tmcc}$ reflects TMCC data modulated on TMCC bins;
lock TMCC information for each said symbol;
subtract modulated TMCC data, $Ph_{tmcc}$, from said approximated phase difference;
relate a mean of said phase difference with frequency offset; and
use a slope of said phase difference to indicate said timing offset.

14. The system of claim 13, wherein said weights are assigned based on channel conditions.

15. A system for performing timing and frequency offset estimation for a channel in an orthogonal frequency division multiplexing (OFDM) environment, wherein said system comprises:

an estimator configured to estimate timing and frequency offsets by different estimation processes, wherein said estimator comprises an auxiliary channel (AC) based timing and frequency offset estimator; and a processor configured to:
assign weights to said timing and frequency offsets based on condition of said channel;
said AC based timing and frequency offset estimator configured to:
calculate timing and frequency offsets using said estimates of timing and frequency offsets and said weights;
approximating a phase difference of an AC bin over two adjacent symbols as $\Delta\phi_k \approx \Delta f T_u + \xi k + Ph_{ac}$, where $T_u$ is a OFDM symbol time, $\Delta f$ is a frequency offset, $\xi = \Delta T/T$ is a timing offset in percentage, k is a sub-carrier (bin) index, and $Ph_{ac}$ is AC data modulated on AC bins;
estimate a value of said $Ph_{ac}$;
subtract said estimated value of $Ph_{ac}$ from said phase difference;
relate mean of said phase difference with frequency offset; and
use a slope of said phase difference to indicate said timing offset.

16. The system of claim 15, wherein said weights are assigned based on channel conditions.

17. A system for performing timing and frequency offset estimation for a channel in an orthogonal frequency division multiplexing (OFDM) environment, wherein said system comprises:

an estimator configured to estimate timing and frequency offsets by different estimation processes, wherein said estimator comprises a channel estimated based timing and frequency offset estimator; and a processor configured to:
assign weights to said timing and frequency offsets based on condition of said channel;
said channel estimated based timing and frequency offset estimator configured to:
calculate timing and frequency offsets using said estimates of timing and frequency offsets and said weights;
interpolate channel estimates on each sub-carrier using scatter pilots;
calculate a phase difference on said channel estimate on each sub-carrier over two adjacent symbols;
relate a mean of said phase difference with frequency offset; and
use a slope of said phase difference to indicate said timing offset.

18. The system of claim 17, wherein said weights are assigned based on channel conditions.

19. A system for performing timing and frequency offset estimation for a channel in an orthogonal frequency division multiplexing (OFDM) environment, wherein said system comprises:

an estimator configured to estimate timing and frequency offsets by different estimation processes, wherein said estimator comprises a time-domain correlation based frequency offset estimator; and a processor configured to:
assign weights to said timing and frequency offsets based on condition of said channel;
said time-domain correlation based timing and frequency offset estimator configured to:
calculate timing and frequency offsets using said estimates of timing and frequency offsets and said weights;
correlate a currently received symbol with a conjugate of a previous symbol received one symbol time ($T_u$) prior to said currently received symbol;
pass said correlated symbol through a moving average filter, wherein the filter comprises a window length equal to the time for a guard interval ($T_g$);
integrate an output of said moving average filter over N symbols with a window size of ($T_u + T_g$); and
detect a peak of the integrator outputs with a phase of said peak indicating frequency offset.

20. The system of claim 19, wherein said weights are assigned based on channel Conditions.

* * * * *